Dec. 14, 1965  J. E. ETTORRE ETAL  3,222,992
MACHINE TOOL FIXTURE
Filed Nov. 8, 1963
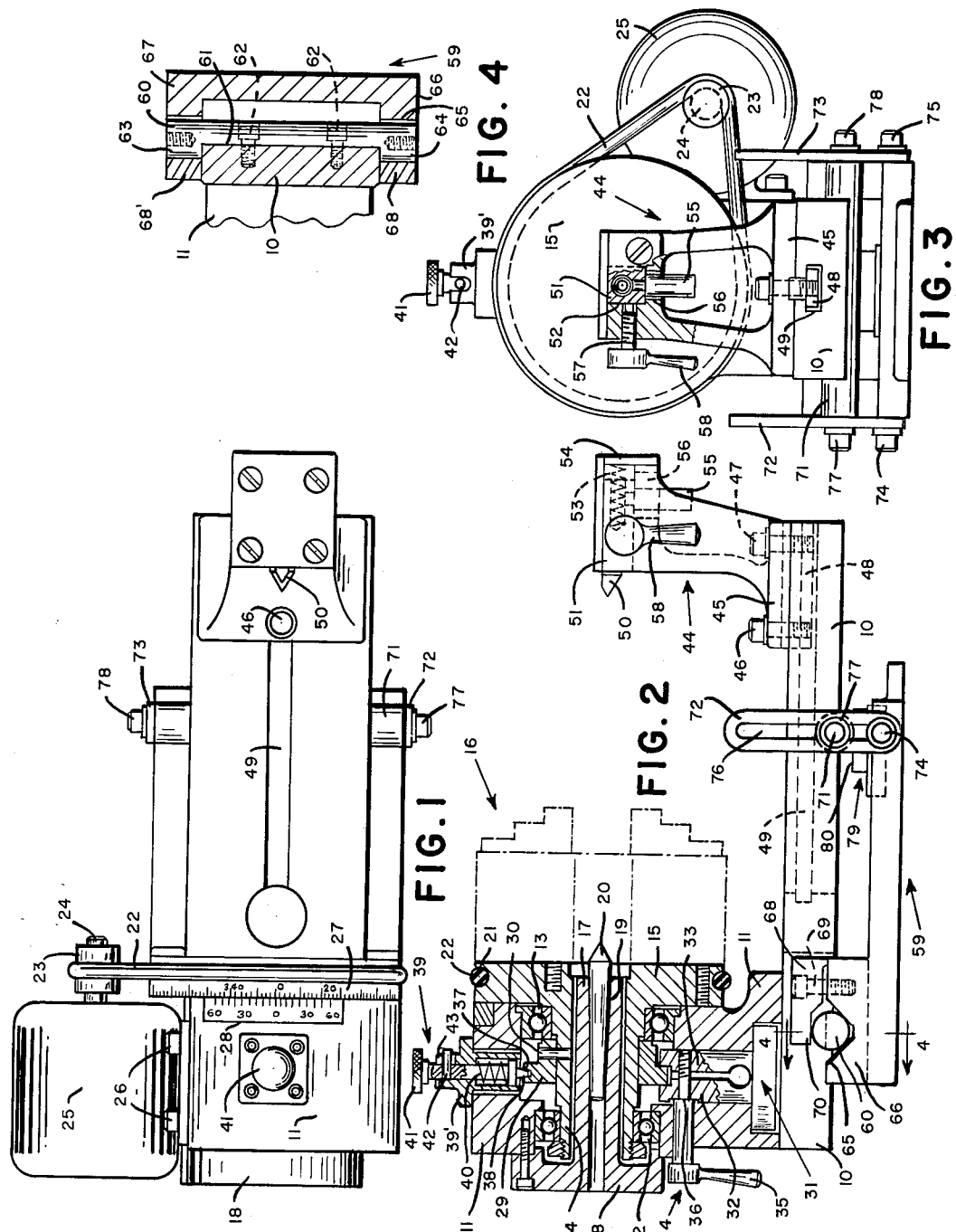
INVENTORS.
JAMES E. ETTORRE
ANDREW C. LINDMARK
BY
*Paul N. Crist*
ATTORNEY United States Patent Office 3,222,992
Patented Dec. 14, 1965

3,222,992
MACHINE TOOL FIXTURE
James E. Ettorre, 472 Stratfield Road, Fairfield, Conn., and Andrew C. Lindmark, 994 Birmingham St., Bridgeport, Conn.
Filed Nov. 8, 1963, Ser. No. 322,306
20 Claims. (Cl. 90—20)

The present invention relates to fixtures for machine tools, and particularly to an improved fixture for supporting work on which various operations are adapted to be performed.

The usual practice in manufacturing accurate tools and machine parts that require a multiplicity of operations is to sequentially position the tool or part to be machined in the work holding device of each of several machines required to perform the multiplicity of operations on the tool or part. The repositioning of the tool or part in the holders of the several machines can introduce errors affecting the accuracy of the tool or part. Furthermore, if the tool or part includes holes that are angularly disposed relative to its principal surfaces or axes, or if the part contains tapered surfaces or non-symmetrical shapes, much time and effort may be required to set up the tool or part in the work holders of the various machine tools required for performing such operations.

The principal object of this invention is to provide a work holding fixture adapted to be mounted with ease on the work supporting table of various machine tools, and having the capability of supporting a work part in a manner such that the above as well as other operations can be performed on it with a single mounting of the work in said fixture.

Another object of the invention is to provide such a fixture in which the part that is mounted therein can be readily and accurately oriented in relation to cutters of various machine tools to produce accurate surface and hole relationships.

Still another object of the invention is to provide such a fixture capable of being used with surface grinders to produce accurate cylindrical, tapered or flat surfaces.

Still another object of the invention is to provide such a fixture capable of being used with a milling machine for milling, with a drill press for drilling, reaming or tapping, with a boring mill for boring, as well as with other machine tools for performing other operations on the work.

Another object of the invention is to provide such a fixture in which the work can be mounted between "dead" centers for cylindrical grinding.

Still another object of the invention is to provide such a fixture in which the axis of the "dead" centers can be inclined to precise angles for taper grinding, or for grinding or milling a flat surface on the work, or for drilling holes in accurate angular relationship to the axis of said "dead" centers.

In one aspect of the invention, a sub-base may rigidly support at each end thereof aligned centers between which work is adapted to be mounted. One center may be mounted within a tapered bore in a fixedly mounted center holder that extends through a bore within a spindle that is mounted in antifriction bearings within a standard fixed to one end of the sub-base.

In another aspect of the invention, the spindle may be provided with a face plate adapted removably to support a work holding chuck or the like, and the face plate and spindle may be rotated by a drive between it and a motor fixed to the standard in which the spindle is journaled.

In still another aspect of the invention, the periphery of the face plate may be accurately divided into degrees and an index thereof may be permanently attached thereto. A vernier scale may be provided on the standard for cooperation with the index for facilitating accurate orientation of a workpiece held by the chuck attached to the face plate.

In a still further aspect of the invention, a disc may be rigidly connected to the spindle supporting the face plate, and a peripheral friction clamping device may be provided for securely holding the spindle, work and chuck at any desired angular position. Alternatively, the periphery of the clamping disc may be provided with accurately spaced holes or slots for the reception of a spring-pressed detent for quickly locating the spindle at predetermined discrete, accurate positions of the spindle and work.

In still another aspect of the invention, a tailstock may be adjustably mounted on the end of the sub-base opposite that supporting the standard and spindle. It may include a "dead" center that is resiliently urged in a direction toward the spindle. A quick action release lever may be provided for the tailstock center, and clamping means may be provided for locking it in its forward or work-engaging position.

In still another aspect of the invention, the sub-base may be mounted on a main base, the latter being adapted to be mounted on the work supporting tables of various machine tools. The mounting between the two bases may comprise a sine bar arrangement including parallel, accurately ground, cylindrical rods fixed to the underside of the sub-base and accurately spaced. One of the sine bars (forward) is directly beneath the standard supporting the spindle. It rests within a V-groove in the sub-base top surface, and a clamp is employed to hold it as well as the sub-base in angular positions as will be described later.

In still another aspect of the invention, the other sine bar (rear) is supported on an accurate block on the main base such that its longitudinal axis and that of the forward sine bar are in a horizontal plane. Clamping straps having slots adapted to receive the ends of the rear sine bar may be pivotally mounted on the main base for maintaining the sub-base at accurately pivoted positions about the axis of the forward sine bar. This adjustment is accomplished by using accurate blocks, such as "Jo" blocks, between the main base and rear sine bar.

The above, other objects and novel features of the invention will become apparent from the following specification and accompanying drawing which are merely exemplary.

In the drawing:

FIG. 1 is a plan view of a fixture to which the principles of the invention have been applied;

FIG. 2 is a side elevational view of the fixture shown in FIG. 1;

FIG. 3 is an end elevational view of the fixture shown in FIGS. 1 and 2; and

FIG. 4 is a sectional view taken substantially along line 4—4 of FIG 2.

Referring to the drawing, the principles of the invention are shown as applied to a fixture including a sub-base 10 having a standard 11 mounted at one end. Antifriction bearings 12 and 13 within a bore in standard 11 support a spindle 14. A face plate 15, integral with spindle 14, is adapted to have a chuck 16 removably fixed to it. The spindle 14 is hollow and is adapted to receive a "dead" center post 17 that is provided with an integral rear bracket 18 that is rigidly fixed to standard 11. Post 17 may be provided with a tapered bore 19 for receiving a "dead" center adapted to support one end of a workpiece.

The peripheral edge of the plate 15 may include a groove 21 adapted to receive a belt 22 that is connected to a pulley 23 fixed to the output shaft 24 of an electric motor 25 that is mounted on the standard 11 by screws 26. The peripheral edge of plate 15 may also include an index 27 of degrees from 0 to 360. In addition, a vernier 28 may be mounted on the top of standard 11 in cooperating position relative to the index 27 for accurately locating the plate 15 at any desired point throughout its path of revolution.

In order to securely fix the plate 15 at a desired rotary position, spindle 14 may be provided with a disc 29 fixed thereto by a pin 30. A clamp 31 may be located in a recess within standard 11, and it may comprise parallel spaced legs 32, 33 adapted to receive between them a portion of the disc 29 near its peripheral edge. A screw clamp 34 having a handle 35 may be mounted in standard 11 and threaded into the leg 33, while having an abutting shoulder 36 in contact with leg 32 such that the turning of handle 35 in one direction clamps disc 29 between the legs 32, 33, and the turning of said handle in the other direction releases disc 29. From the foregoing it is evident that releasing clamp 31 permits the turning of face plate 15 to any desired rotary position, and rendering clamp 31 effective locks the plate in said position.

Alternatively, the peripheral edge of disc 29 may be provided with accurately and peripherally spaced holes or slots 37 adapted to receive the end 38 of a spring-pressed detent 39. Detent 39 is mounted in a housing 39' and it may include a shank portion surrounded by a spring 40 that normally urges the end 38 downwardly. A knob 41 is provided on the top of the shank, and a pin 42 is adapted to ride in a vertical slot 43 within housing 39'. The construction is such that raising knob 41 raises pin 42 above the top of the slot 43, and upon turning knob 41, pin 42 rests on the top of housing 39', maintaining the end 38 above the periphery of the disc 29. Accordingly, in this condition, assuming clamp 31 is released, the plate 15 can be turned to any desired rotary position corresponding to one of the holes 37; and when knob 41 is turned to cause pin 42 to be aligned with slot 43 and released, the disc is locked by the end 38 of detent 39.

The sub-base 10 is adapted to support a tailstock 44 at its end opposite that to which standard 11 is attached. The tailstock may comprise a plate 45 having bolts 46, 47 extending therethrough and threaded into a plate 48 that rides within a slot 49 extending along the longitudinal centerline of the sub-base 10. From the foregoing it is evident that loosening of screws 46, 47 will permit tailstock 44 to be adjustably located at any point along groove 49.

The tailstock 44 may include a "dead" center 50 having a shank 51 that is slidably mounted with a way 52 formed in the top of the tailstock 44. The longitudinal axis of center 50 is coincident with that of center 20 and is resiliently urged toward the latter by a spring 53 that is received within a bore of shank 51, said spring being backed up by a plate 54 on the tailstock 44.

A handle 55 is attached to shank 51 and extends downwardly through a recess 56 in the top of tailstock 44 such that it is easily gripped by the hand of an operator. A screw 57 having a handle 58 attached to it is threaded into the tailstock in a manner to release or bind the shank 51. With the screw 57 released, shank 51 can be pulled rearwardly against the action of spring 53 so that a workpiece can be mounted between centers 20 and 50, after which handle 55 is released, permitting the centers 50 and 20 to support the workpiece, and the handle may be turned to lock the center 50.

The sub-base 10 may be mounted on a main base 59 through a sine bar arrangement. Thus, a bar 60 (FIG. 4) that is notched at 61 may receive the sub-base 10, and the bar 60 may be fixed to sub-base 10 by screws 62. The cylindrical ends 63, 64 of bar 60 are received within aligned V-notches 65 formed in two parallel spaced ears 66, 67 extending upwardly from the main base 59 and at one end thereof. Clamping blocks 68 and 68' may be held to main base 59 by screws 69, one end 70 of the clamping blocks overlying bar 60.

Another bar 71 may be attached to sub-base 10 in a manner similar to that of attaching bar 60 thereto. Bar 71 may be located at a predetermined distance from bar 60, parallel with it and positioned so that its longitudinal axis lies in a plane including the longitudinal axis of bar 60, which plane is parallel with the longitudinal axes of the centers 20 and 50.

Clamping straps 72 and 73 may be pivotally attached in aligned relation on each side of main base 59 by pivot bolts 74, 75. The straps 72, 73 may include elongated slots 76 therein through which may extend screws 77 and 78 that are threaded into the ends of bar 71, thus adjustably locking the bar 71 to the straps 72, 73 in any desired location along slots 76. A support 79 may have a surface 80 adapted, when bar 71 rests on it, to maintain a parallel relation between the bottom of main base 59 and the axis passing longitudinally through centers 20 and 50.

From the foregoing it is evident that the axis passing longitudinally through the centers 20 and 50 can be adjusted to any desired angle relative to the bottom of the main base by multiplying the distance between the axes 60, 71 by the sine of the angle desired. This gives a value which can be translated into accurate shims or blocks such as "Jo" blocks. Placing such blocks between surface 80 and bar 71 and locking bar 71 in its adjusted position in slots 76 will provide the desired angle.

It is, of course, possible to reverse the sub-base on the main base when opposite angular relations are desired.

Although the various features of the improved fixture have been shown and described in detail to fully disclose one embodiment of the invention, it will be evident that changes may be made in such details and certain features may be used without others without departing from the principles of the invention.

What is claimed is:

1. A fixture for a machine tool comprising in combination, a sub-base; a standard integrally connected to one end of said sub-base; a spindle mounted in said standard for free rotary movement about an axis parallel with said sub-base; a face plate connected to said spindle; an index about the peripheral edge of said plate; a vernier on said standard with which said index cooperates; a disc fixed to said spindle; and clamping means adapted releasably to clamp said disc in any of the rotary positions of said plate.

2. A fixture for a machine tool comprising in combination, a sub-base; a standard integrally connected to one end of said sub-base; a spindle mounted in said standard for free rotary movement about an axis parallel with said sub-base; a face plate connected to said spindle; an index about the peripheral edge of said plate; a vernier on said standard with which said index cooperates; a disc fixed to said spindle; clamping means adapted releasably to clamp said disc in any of the rotary positions of said plate; and detent means adapted to cooperate with notches spaced about the periphery of said disc.

3. A fixture for a machine tool comprising in combination, a sub-base; a standard integrally connected to one end of said sub-base; a spindle mounted in said standard for free rotary movement about an axis parallel with said sub-base; a face plate connected to said spindle; a motor mounted on said standard; a drive between said motor and said plate; an index about the peripheral edge of said plate; a vernier on said standard with which said index cooperates; a disc fixed to said spindle; and clamping means adapted releasably to clamp said disc in any of the rotary positions of said plate.

4. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; an index about the peripheral edge of said plate; a vernier on said standard with which said index cooperates; a disc fixed to said spindle; and clamping means adapted releasably to clamp said disc in any of the rotary positions of said plate.

5. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; an index about the peripheral edge of said plate; a vernier on said standard with which said index cooperates; a disc fixed to said spindle; clamping means adapted releasably to clamp said disc in any of the rotary positions of said plate; and a tailstock mounted on said sub-base at the end thereof opposite that to which said standard is connected.

6. A fixture for a machine tool comprising in combination, a sub-base; a standard integrally connected to one end of said sub-base; a spindle mounted in said standard for free rotary movement about an axis parallel with said sub-base; a face plate connected to said spindle; an index about the peripheral edge of said plate; a vernier on said standard with which said index cooperates; a disc fixed to said spindle; clamping means adapted releasably to clamp said disc in any of the rotary positions of said plate; a main base; and a sine bar arrangement between said main base and sub-base.

7. A fixture for a machine tool comprising in combination, a sub-base; a standard integrally connected to one end of said sub-base; a spindle mounted in said standard for free rotary movement about an axis parallel with said sub-base; a face plate connected to said spindle; an index about the peripheral edge of said plate; a vernier on said standard with which said index cooperates; a disc fixed to said spindle; clamping means adapted releasably to clamp said disc in any of the rotary positions of said plate; detent means adapted to cooperate with notches spaced about the periphery of said disc; a main base; and a sine bar arrangement between said main base and sub-base.

8. A fixture for a machine tool comprising in combination, a sub-base; a standard integrally connected to one end of said sub-base; a spindle mounted in said standard for free rotary movement about an axis parallel with said sub-base; a face plate connected to said spindle; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; a main base; and a sine bar arrangement between said main base and sub-base.

9. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; an index about the peripheral edge of said plate; a vernier on said standard with which said index cooperates; a disc fixed to said spindle; clamping means adapted releasably to clamp said disc in any of the rotary positions of said plate; a main base; and a sine bar arrangement between said main base and sub-base.

10. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; an index about the peripheral edge of said plate; a vernier on said standard with which said index cooperates; a disc fixed to said spindle; clamping means adapted releasably to clamp said disc in any of the rotary positions of said plate; a tailstock mounted on said sub-base at the end thereof opposite that to which said standard is connected; a main base; and a sine bar arrangement between said main base and sub-base.

11. A fixture for a machine tool comprising in combination, a sub-base; a standard integrally connected to one end of said sub-base; a spindle mounted in said standard for free rotary movement about an axis parallel with said sub-base; a face plate connected to said spindle; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; and detent means adapted to cooperate with notches spaced about the periphery of said disc.

12. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; and clamping means adapted releasably to clamp said disc in any of the rotary positions of said plate.

13. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; and detent means adapted to cooperate with notches spaced about the periphery of said disc.

14. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; and a tailstock mounted on said sub-base at the end thereof opposite that to which said standard is connected.

15. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; detent means adapted to cooperate with notches spaced about the periphery of said disc; and a tailstock mounted on said sub-base at the end thereof opposite that to which said standard is connected.

16. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; a main base; and a sine bar arrangement between said main base and sub-base.

17. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; a tailstock mounted on said sub-base at the end thereof opposite that to which said standard is connected; a main base; and a sine bar arrangement between said main base and sub-base.

18. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; detent means adapted to cooperate with notches spaced about the periphery of said disc; a main base; and a sine bar arrangement between said main base and sub-base.

19. A fixture for a machine tool comprising in combination, a sub-base; a standard integrally connected to one end of said sub-base; a spindle mounted in said standard for free rotary movement about an axis parallel with said sub-base; a face plate connected to said spindle; a stationary support extending through a longitudinal bore in said spindle; a dead center in said support; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; detent means adapted to cooperate with notches spaced about the periphery of said disc; a tailstock mounted on said sub-base at the end thereof opposite that to which said standard is connected; a main base; and a sine bar arrangement between said main base and sub-base.

20. A fixture for a machine tool comprising in combination, a sub-base; a standard integrally connected to one end of said sub-base; a spindle mounted in said standard for free rotary movement about an axis parallel with said sub-base; a face plate connected to said spindle; a motor mounted on said standard; a drive between said motor and said plate; an index about the peripheral edge of said plate; a vernier on said standard with which said index cooperates; a disc fixed to said spindle; clamping means adapted releasably to clamp said disc in any of the rotary positions of said plate; detent means adapted to cooperate with notches spaced about the periphery of said disc; a main base; and a sine bar arrangement between said main base and sub-base.

References Cited by the Examiner

UNITED STATES PATENTS

| | | |
|---|---|---|
| 167,572 | 9/1875 | Seaver. |
| 1,260,271 | 3/1918 | Kramer _____ 90—56 |
| 2,205,361 | 6/1940 | Kearney et al. _____ 90—56 |
| 2,351,773 | 6/1944 | Lovenston. |
| 2,369,425 | 2/1945 | Becker. |
| 2,378,743 | 6/1945 | Wisne. |
| 3,074,298 | 1/1963 | Hardy. |
| 3,120,725 | 2/1964 | Milewski et al. _____ 51—237 |

FOREIGN PATENTS

| | | |
|---|---|---|
| 409,930 | 2/1925 | Germany. |
| 144,194 | 2/1954 | Sweden. |

WILLIAM W. DYER, Jr., *Primary Examiner.*